(12) United States Patent
Deutsch et al.

(10) Patent No.: US 11,893,407 B2
(45) Date of Patent: Feb. 6, 2024

(54) OVERLAY CONTAINER STORAGE DRIVER FOR MICROSERVICE WORKLOADS

(71) Applicant: RED HAT, INC., Raleigh, NC (US)

(72) Inventors: Fabian Deutsch, Grasbrunn (DE); Adam Gerard Litke, Harrisburg, PA (US); Huamin Chen, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 239 days.

(21) Appl. No.: 17/030,747

(22) Filed: Sep. 24, 2020

(65) Prior Publication Data
US 2022/0091871 A1 Mar. 24, 2022

(51) Int. Cl.
*G06F 9/455* (2018.01)
*G06F 9/4401* (2018.01)

(52) U.S. Cl.
CPC ........ *G06F 9/45558* (2013.01); *G06F 9/4411* (2013.01); *G06F 2009/4557* (2013.01); *G06F 2009/45566* (2013.01)

(58) Field of Classification Search
None
See application file for complete search history.

(56) References Cited

U.S. PATENT DOCUMENTS

| | | | |
|---|---|---|---|
| 9,967,204 B2 | 5/2018 | Holden et al. | |
| 10,353,714 B1 * | 7/2019 | Gokam | G06F 3/0634 |
| 2018/0018129 A1 * | 1/2018 | Nikaido | G06F 11/3433 |
| 2018/0218530 A1 * | 8/2018 | Vembu | G06F 9/5005 |
| 2019/0097900 A1 * | 3/2019 | Rodriguez | G06F 16/27 |
| 2019/0286326 A1 | 9/2019 | Pabon | |
| 2019/0370182 A1 * | 12/2019 | McClure | G06F 3/067 |
| 2020/0151021 A1 | 5/2020 | Sutton et al. | |
| 2020/0233961 A1 * | 7/2020 | Wolfin | G06F 11/3495 |
| 2020/0250112 A1 * | 8/2020 | Raisch | G06F 9/30087 |
| 2020/0371700 A1 * | 11/2020 | Stabrawa | G06F 3/0631 |
| 2021/0103395 A1 * | 4/2021 | Yankovskiy | G06F 3/0604 |
| 2021/0240621 A1 * | 8/2021 | Fu | G06F 12/084 |

OTHER PUBLICATIONS

Xiong, O. et al. (Aug. 2, 2018). "Dynamically Expand Volume with CSI and Kubernetes", Kubernetes Blog, https://kubernetes.io/blog/2018/08/02/dynamically-expand-volume-with-csi-and-kubernetes/, 5 pages.

(Continued)

*Primary Examiner* — Wynuel S Aquino
(74) *Attorney, Agent, or Firm* — Womble Bond Dickinson (US) LLP

(57) ABSTRACT

A first command is received from a workload, by a host system executing a nested container storage interface (CSI) driver, to create a persistent volume. The nested CSI driver converts the first command used by the workload to create the persistent volume to a second command used by the host system to increase a capacity of a previously generated persistent volume allocated to the workload. The second command is transmitted to an undercluster CSI driver of the host system, wherein the second command causes the undercluster CSI driver to increase the capacity of the previously generated persistent volume.

15 Claims, 13 Drawing Sheets

(56) References Cited

OTHER PUBLICATIONS

Hindman, R. et al. (Feb. 14, 2017). "Deploying IaaS VM Guest Clusters in Microsoft Azure", Microsoft Tech Community, https://techcommunity.microsoft.com/t5/failover-clustering/deploying-iaas-vm-guest-clusters-in-microsoft-azure/ba-p/372126, 14 pages.

Cormac. (Apr. 23, 2020). "vSphere 7.0, Cloud Native Storage, CSI and offline volume extend", https://cormachogan.com/2020/04/23/vsphere-7-0-cloud-native-storage-csi-and-offline-volume-extend/, 10 pages.

European Patent Convention Extended European Search Report for European Patent Application No. 20214081.0, dated May 18, 2021, pp. 10.

* cited by examiner

1100

```
┌─────────────────────────────────────┐
│ GENERATE AN EXECUTION ENVIRONMENT FOR│
│   EXECUTION OF A WORKLOAD, WHEREIN THE│
│     EXECUTION ENVIRONMENT COMPRISES A│
│      NESTED CONTAINER STORAGE INTERFACE│
│       (CSI) DRIVER THAT CONVERTS A FIRST│
│      COMMAND RECEIVED FROM THE WORKLOAD│
│       TO A SECOND COMMAND USED BY A HOST│
│                 SYSTEM              │
│                  1110               │
└─────────────────────────────────────┘
                   │
                   ▼
┌─────────────────────────────────────┐
│   ALLOCATE A PERSISTENT VOLUME ON THE│
│      HOST SYSTEM TO THE EXECUTION   │
│  ENVIRONMENT, WHEREIN A CAPACITY OF THE│
│   PERSISTENT VOLUME IS MODIFIED IN VIEW OF│
│    THE SECOND COMMAND USED BY THE HOST│
│                 SYSTEM              │
│                  1120               │
└─────────────────────────────────────┘
```

OVERLAY CONTAINER STORAGE DRIVER FOR MICROSERVICE WORKLOADS

TECHNICAL FIELD

Aspects of the present disclosure relate to a microservice architecture, and more particularly, to an overlay container storage driver for microservice workloads.

BACKGROUND

Microservice architecture is an architectural style of a computing system that structures an application as a collection of services. The services can be independently developed, tested and deployed by different teams. Microservice architectures enable the deployment of large, complex applications at a rapid pace.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 11 is a flow diagram of a method of generating an execution environment for execution of a workload, in accordance with some embodiments.

DETAILED DESCRIPTION

Figure 1:
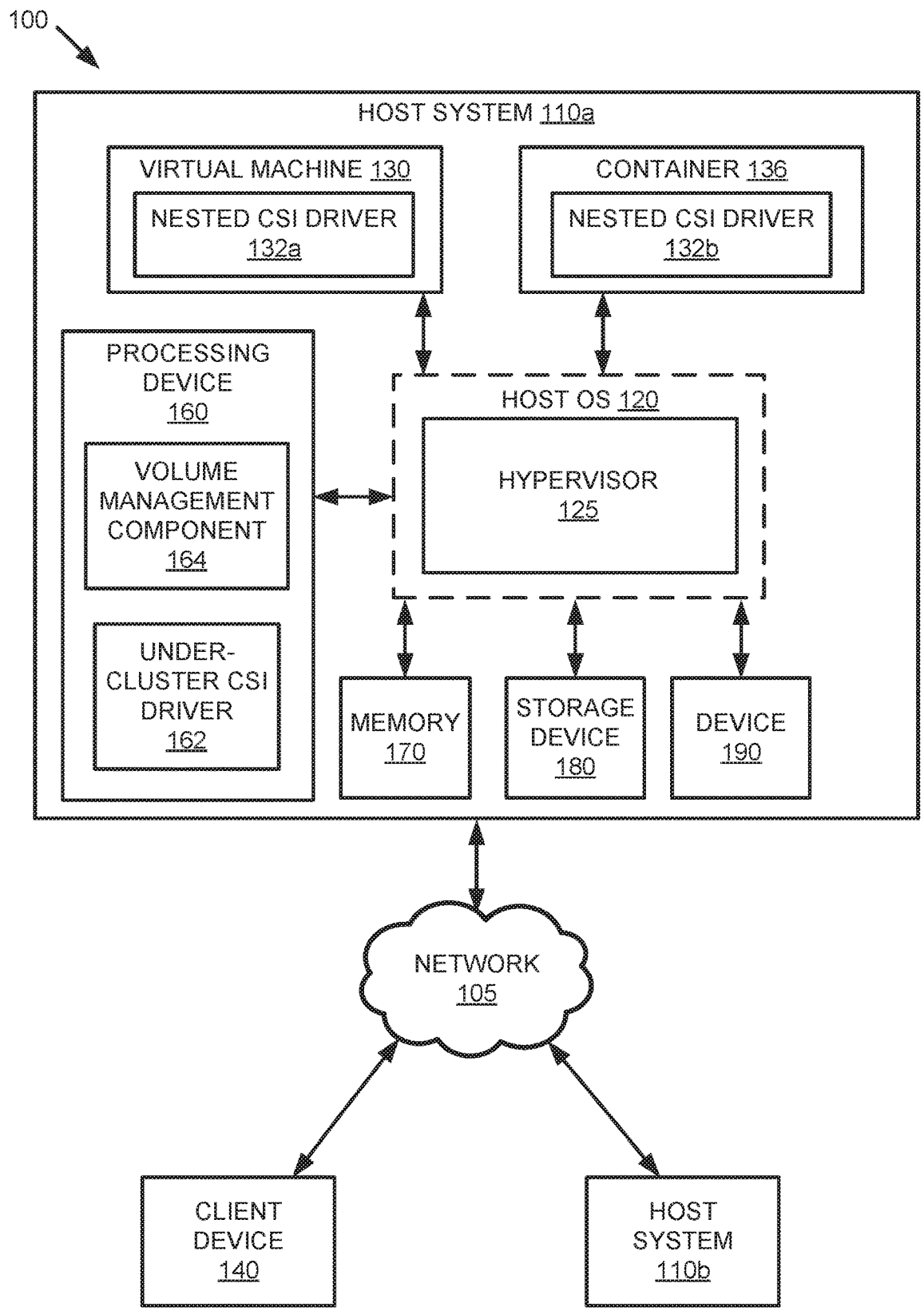
FIG. 1 is a block diagram that illustrates an example computer architecture, in accordance with some embodiments.

On a microservice architecture, an application may be made up of multiple services. These services and their associated workloads may be executed within execution environments that are supported by host systems of the microservice architecture. In embodiments, an execution environment of the microservice architecture may be a virtual machine (VM) or a container.

In a conventional microservice architecture, virtualization technology is deployed on the physical computing resources of the host systems, which is used to generate the VMs and/or containers for executing different workloads. To orchestrate the use of the physical computing resources by the various execution environments, the conventional microservice architecture may utilize cluster management operators that include an undercluster and an overcluster. An undercluster may correspond to the lowest level of orchestration running on the physical computing resources (e.g., bare metal) of the host system supporting the execution environments. The overcluster may correspond to a cluster management operator that is provisioned within an execution environment of the microservice architecture. For example, the overcluster may be provisioned in a container within one of the execution environments supported by the host system. The undercluster and the overcluster may communicate with one another to orchestrate the use of the physical computing resources of a host system by a workload executed within an execution environment.

Prior to the instantiation of the execution environments, the undercluster may have existing storage clusters that may be used for storage of data by one or more host systems of the microservice architecture. In a conventional microservice architecture, however, the overcluster is unable to use these existing storage clusters due to contention issues and/or lacking the required credentials to access the existing storage clusters. Because the overcluster is unable to determine which areas of the storage cluster are being used by the undercluster, there is the potential for the overcluster and undercluster to use the same areas of the storage cluster, which may lead to the loss or corruption of data. To avoid this, the overcluster creates new storage cluster(s), which increases the overhead and decreases the performance of the host system and the microservice architecture.

Aspects of the disclosure address the above-noted and other deficiencies by utilizing a nested container storage interface (CSI) driver within the overcluster to convert commands received from a workload to commands that are used by the undercluster and/or host system. When a workload being executed by an execution environment wants to create or delete a persistent volume, the nested CSI driver may receive a command from the workload. For example, when the workload requires additional capacity for the storage of data, the workload may transmit a command to the nested CSI driver to create a new persistent volume for data storage.

However, rather than creating or deleting the persistent volume in accordance with the received command, the nested CSI driver may convert the command received from the workload to create/delete a persistent volume to a command used by the host system to resize a previously generated persistent volume. For example, the nested CSI driver may convert a command received from a workload to create a new persistent volume to a resize command that increases the capacity of a previously generated persistent volume used by the undercluster.

Upon converting the command, the nested CSI driver may transmit the converted command to resize the previously generated persistent volume manager to an undercluster CSI driver. The undercluster CSI driver may then transmit the resize command to a volume management component, such as a logical volume manager or network storage driver, which manages the allocation of physical memory to persistent volumes of a host system. The volume management component may then resize the capacity of the persistent volume based on the command received from the undercluster CSI driver to increase or decrease the capacity of the previously generated persistent volume that can be used by the workload.

By having a nested CSI driver convert the commands received from a workload, previously generated persistent volumes of the undercluster can be accessed by the workload, rather than requiring separate persistent volumes to be created or deleted for the workload. Allowing the workload to access the previously generated persistent volumes used by the undercluster reduces overhead of the microservice architecture by reducing the number of persistent volumes that are created or deleted for workloads of the microservice architecture, improving the performance of the microservice architecture.

FIG. 1 depicts a high-level component diagram of an illustrative example of a computer system architecture 100, in accordance with one or more aspects of the present disclosure. One skilled in the art will appreciate that other computer system architectures 100 are possible, and that the implementation of a computer system utilizing examples of the invention are not necessarily limited to the specific architecture depicted by FIG. 1.

As shown in FIG. 1, computer system architecture 100 includes host systems 110a, b and client device 140. The host systems 110a, b and client device 140 include one or more processing devices 160, memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, memory 170 may be non-uniform access (NUMA), such that memory access time depends on the memory location relative to processing device 160. It should be noted that although, for simplicity, a single processing device 160, storage device 180, and device 190 are depicted in FIG. 1, other embodiments of host systems 110a, b and client device 140 may include a plurality of processing devices, storage devices, and devices. The host systems 110a, b and client device 140 may be a server, a mainframe, a workstation, a personal computer (PC), a mobile phone, a palm-sized computing device, etc. In embodiments, host systems 110a, b and client device 140 may be separate computing devices. In some embodiments, host systems 110a, b and/or client device 140 may be implemented by a single computing device. For clarity, some components of client device 140 and host system 110b are not shown. Furthermore, although computer system architecture 100 is illustrated as having two host systems and a single client device, embodiments of the disclosure may utilize any number of host systems and any number of client devices.

Host system 110a, b may additionally include one or more virtual machines (VMs) 130, one or more containers 136, and host operating system (OS) 120. VM 130 is a software implementation of a machine that executes programs as though it was an actual physical machine. Container 136 acts as isolated execution environments for different functions of applications, as previously described. The VM 130 and container 136 may serve as execution environments for workloads of a microservice architecture. Host OS 120 manages the hardware resources of the computer system and provides functions such as inter-process communication, scheduling, memory management, and so forth. In embodiments, virtual machine 130 and container 136 may include nested CSI driver 132a and nested CSI driver 132b, respectively. Additional details with regards to the nested CSI driver 132a and nested CSI driver 132 are discussed at FIGS. 2-13 below.

Host OS 120 may include a hypervisor 125 (which may also be known as a virtual machine monitor (VMM)), which provides a virtual operating platform for VMs 130 and manages their execution. Hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. Hypervisor 125 may present other software (i.e., "guest" software) the abstraction of one or more VMs that provide the same or different abstractions to various guest software (e.g., guest operating system, guest applications). It should be noted that in some alternative implementations, hypervisor 125 may be external to host OS 120, rather than embedded within host OS 120, or may replace host OS 120.

The host systems 110a, b, and client device 140 are coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g., cell towers), etc. The network 105 may carry communications (e.g., data, message, packets, frames, etc.) between the various components of host systems 110a, b and/or client device 140.

In embodiments, processing device 160 may execute an undercluster CSI driver 162 and/or a volume management component 164. The undercluster CSI driver 162 may receive resize commands for a persistent volume from the nested CSI driver 132a and/or nested CSI driver 132b. The undercluster CSI driver 162 may transmit the resize command to the volume management component 164 to resize the persistent volume. In embodiments, the volume management component 164 may correspond to a logical volume manager. In an embodiment, the volume management component 164 may correspond to a network storage driver. Further details regarding the undercluster CSI driver 162 and the volume management component 164 will be discussed at FIGS. 2-13 below.

Figure 2:
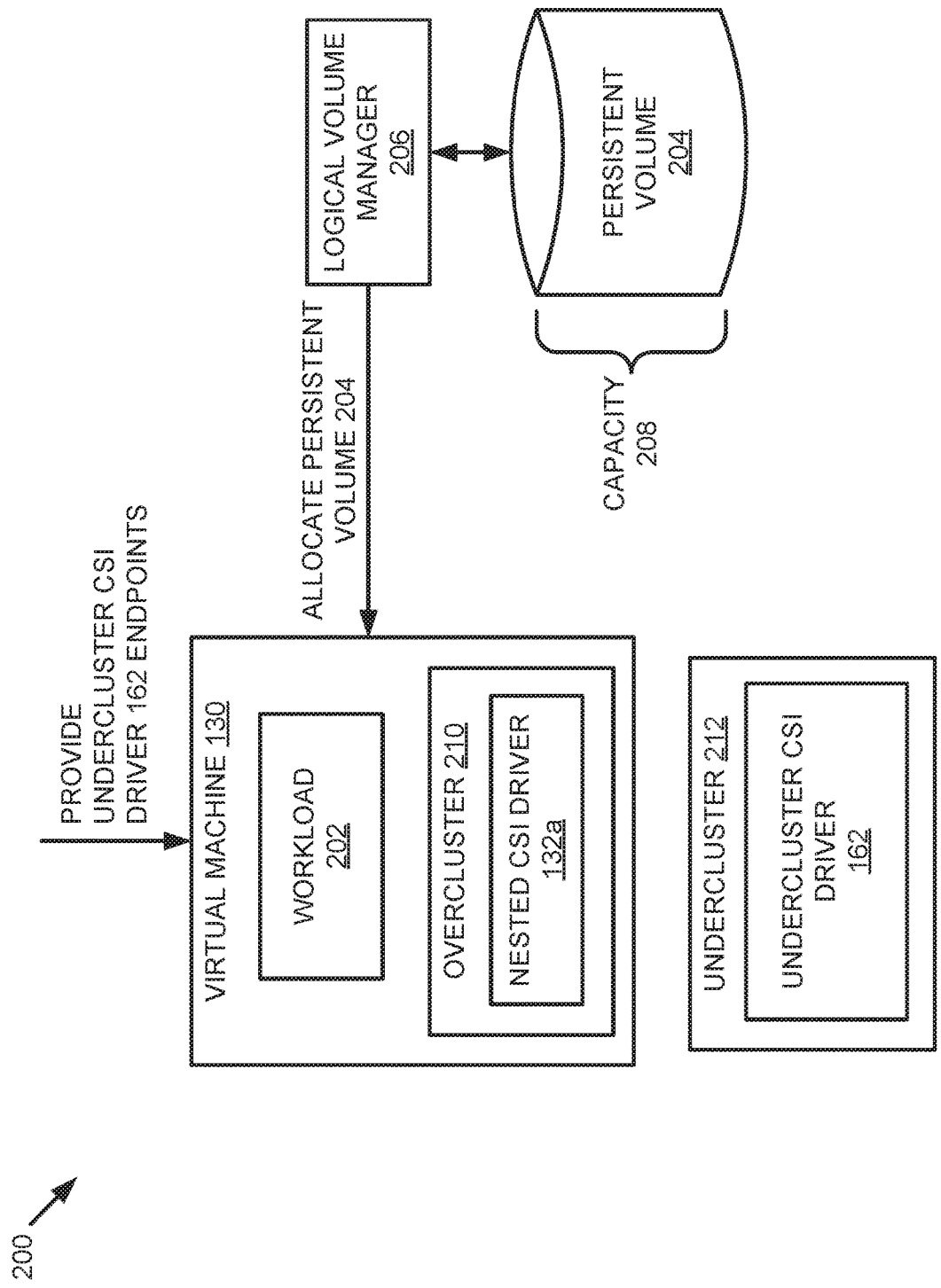
FIG. 2 is an illustration of an example of instantiating a virtual machine on a host system of a microservice architecture, in accordance with embodiments of the disclosure.

FIG. 2 is an illustration of an example of instantiating a virtual machine on a host system 200 of a microservice architecture, in accordance with embodiments of the disclosure. As previously described, in a microservice architecture execution environments, such as virtual machine 130 or a container (e.g., container 136), may be instantiated for the execution of workloads (e.g., workload 202) of various applications or services of the microservice architecture. The host system 200 may include a persistent volume 204, a logical volume manager 206, an overcluster 210, and an undercluster 212. In embodiments, host system 200 may correspond to host system 110a or host system 110b, as previously described at FIG. 1.

The persistent volume 204 may correspond to a piece of storage of the host system 200 that has been provisioned for the storage of data. In embodiments, the persistent volume 204 may correspond to a provisioned amount of space for storing data at storage device 180 of FIG. 1. The logical volume manager 206 may be executed by processing logic of a processing device (e.g., processing device 160) of host system 200. The logical volume manager 206 manages the provisioning of physical memory of host system 200 to persistent volumes, such as persistent volume 204. The logical volume manager 206 may also allocate persistent volumes to different execution environments and/or workloads of the microservice architecture.

The overcluster 210 and undercluster 212 may correspond to cluster management operators that orchestrate the use of the physical computing resources of host system 200 by the various execution environments. The undercluster 212 may correspond to the lowest level of orchestration that running on the processing device (e.g., processing device 160) of the host system supporting the execution environments. The overcluster 210 may correspond to a cluster management operator that is provisioned within an execution environment. For example, the overcluster 210 may be provisioned in a container within one of the execution environments supported by the host system 200. The undercluster 212 and the overcluster 210 may communicate with one another to orchestrate the use of the physical computing resources of host system 200 by a workload executed within an execution environment.

Referring to FIG. 2, when a virtual machine 130 (or container) is instantiated for the execution of workload 202, an overcluster 210 that includes a nested CSI driver 132a is provisioned within the virtual machine 130. When the virtual machine 130 is instantiated, the nested CSI driver 132a may be provided with communication endpoints of the undercluster CSI driver 162 of the undercluster 212 to enable the transmission of commands between the nested CSI driver 132a and the undercluster CSI driver 162.

Furthermore, when the virtual machine 130 is instantiated, the logical volume manager 206 may allocate persistent volume 204 to virtual machine 130 and/or workload 202. In embodiments, the logical volume manager 206 may annotate the persistent volume 204 with a reference to virtual machine 130 and/or workload 202. The annotation may enable the nested CSI driver 132a to identify the persistent volume 204 allocated to the virtual machine 130 and/or workload 202 and start the network storage service on the virtual machine 130 to expose the persistent volume 204 as a network storage device. In some embodiments, the logical volume manager 206 may annotate the persistent volume 204 with a reference to the persistent volume 204 used by the undercluster 212 and undercluster CSI driver 162. In embodiments, the nested CSI driver 132a may be provided with one or more specifications associated the persistent volume 204 that may be used by the nested CSI driver 132a to issue resize commands that may be used by the undercluster CSI driver 162 and logical volume manager 206 to resize the persistent volume 204.

When the persistent volume 204 is provisioned by the logical volume manager 206, the persistent volume 204 may have an initial capacity 208. For example, the persistent volume 204 may have an initial capacity of 1 gigabyte (GB).

Figure 3:
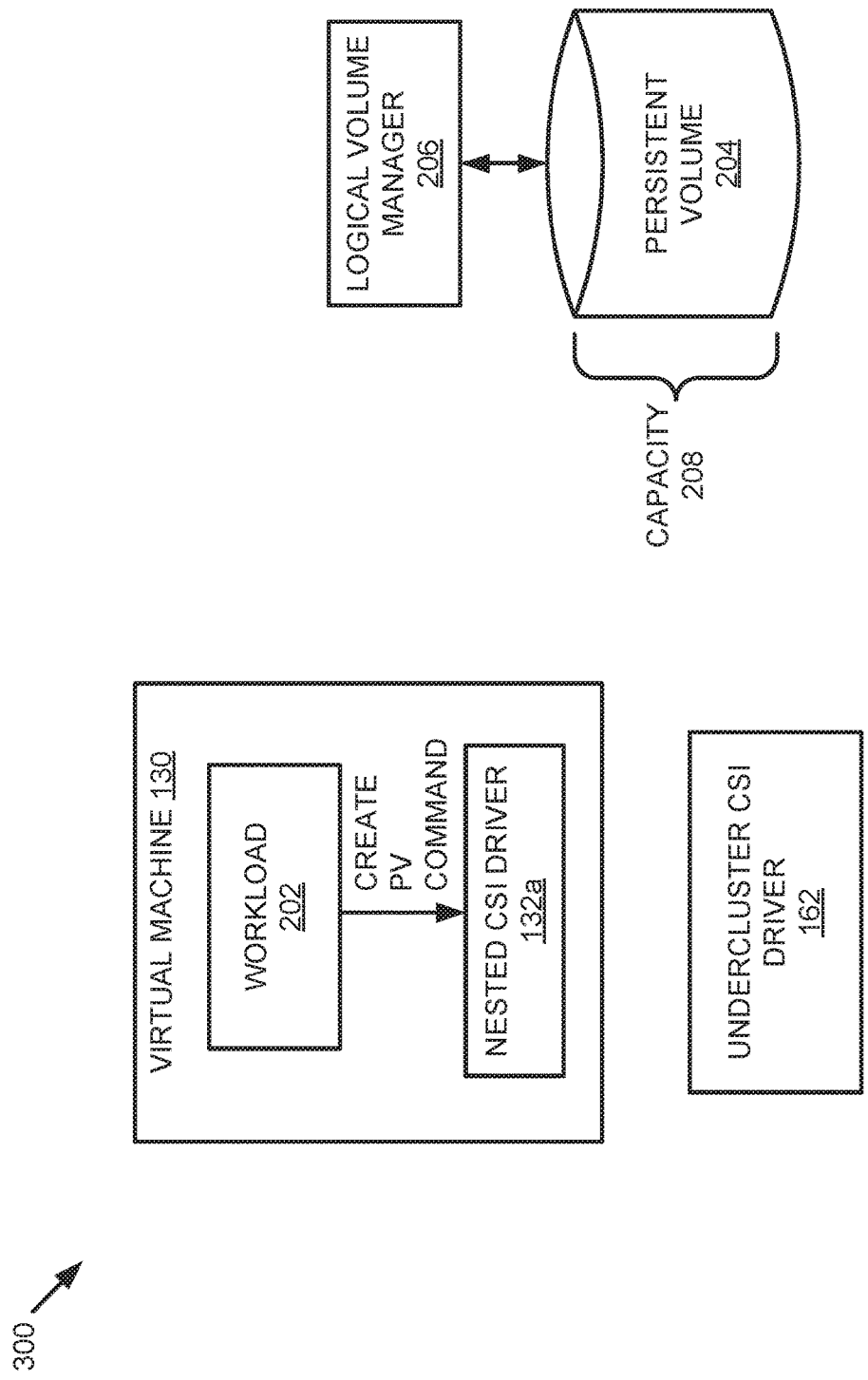
FIG. 3 is an illustration of an example of a nested CSI driver of a host system receiving a command from a workload, in accordance with embodiments of the disclosure.

FIG. 3 is an illustration of an example of a nested CSI driver of a host system 300 receiving a command from a workload, in accordance with embodiments of the disclosure. As previously described, workload 202 may issue commands to create or delete persistent volumes for use by the workload 202 based on the workload requiring more or less storage capacity for the storage of data. For example, if workload 202 requires additional storage capacity, the workload 202 may issue a command to the nested CSI driver 132a to create a new persistent volume for use by the workload 202.

Referring to FIG. 3, the workload 202 has transmitted a create persistent volume (PV) command to the nested CSI driver 132a, indicating that a new persistent volume is to be created for use by workload 202. In embodiments, the create PV command may include a capacity for the persistent volume that is to be created. For example, the create PV command may indicate that a persistent volume having a capacity of 10 GB is to be created.

Upon receiving the create PV command from the workload 202, the nested CSI driver 132a may convert the create PV command to a resize command that may be used by the undercluster CSI driver to modify the capacity 208 of persistent volume 204. In embodiments, the nested CSI driver 132a may convert the create PV command by using the one or more specifications associated with the persistent volume 204 that were received by the nested CSI driver 132a when the persistent volume 204 was allocated to the virtual machine 130 and/or workload 202, as previously described at FIG. 2.

In embodiments, the nested CSI driver 132a may determine an amount that the capacity 208 of the persistent volume 204 is to be resized by. For example, if the persistent volume 204 has an initial capacity of 1 GB, and the create PV command indicated that a 10 GB persistent volume is to be created, then the nested CSI driver 132a may determine that the capacity 208 of the persistent volume is to be increased by 9 GB, resulting in the resized capacity of persistent volume 204 being 10 GB.

Figure 4:
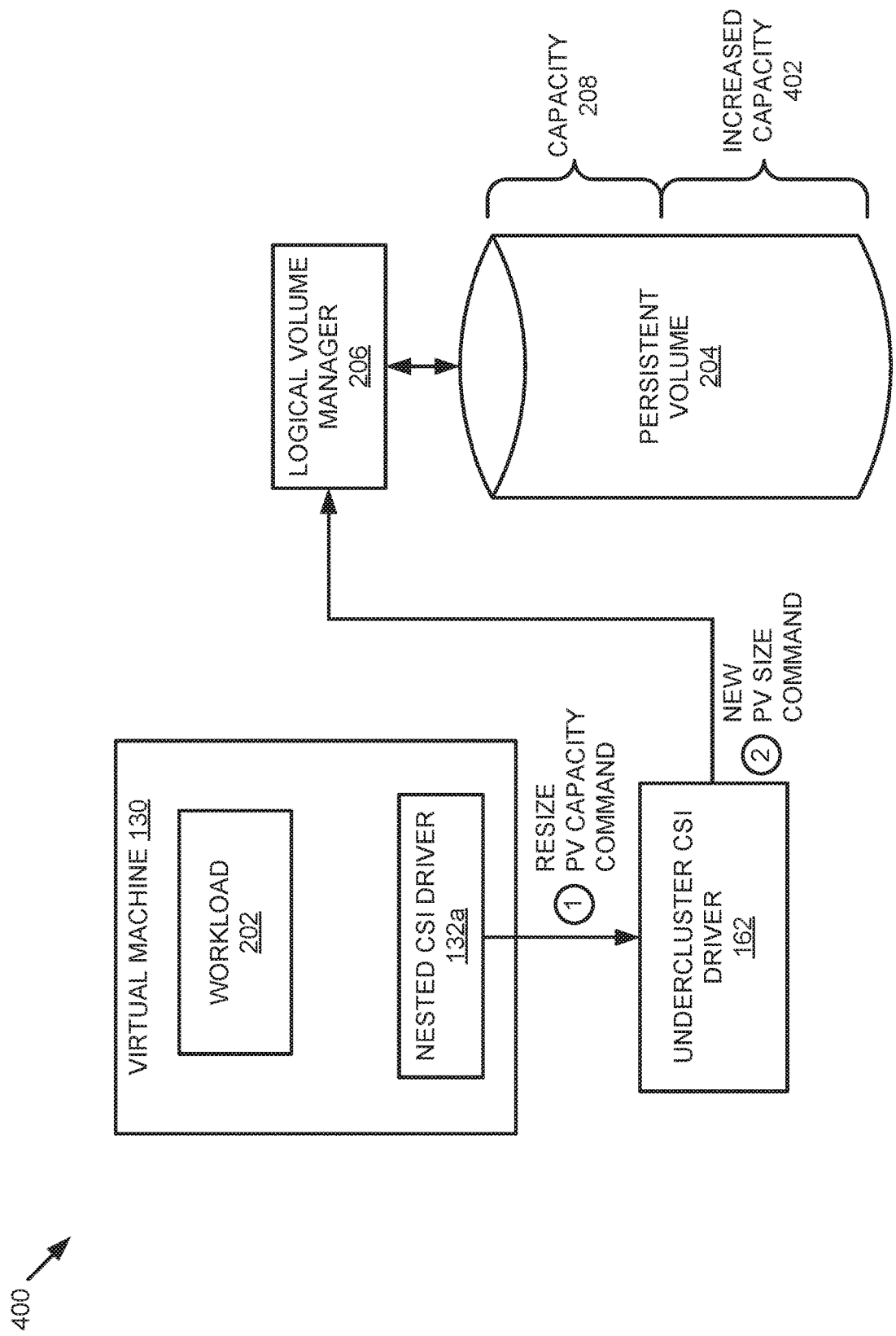
FIG. 4 is an illustration of an example of a nested CSI driver of a host system transmitting a resize command to an undercluster CSI driver, in accordance with embodiments of the disclosure.

FIG. 4 is an illustration of an example of a nested CSI driver of a host system 400 transmitting a resize command to an undercluster CSI driver, in accordance with embodiments of the disclosure. In FIG. 4, the nested CSI driver 132a has converted the create PV command received from the workload 202 into a resize PV capacity command. In embodiments, the resize PV capacity command may include the annotation of the persistent volume 204 used by the undercluster CSI driver 162 so that the undercluster CSI driver 162 can identify the correct persistent volume that is to be resized. The resize PV capacity command may include an amount that the capacity 208 of persistent volume 204 is to be increased by (e.g., increased capacity 402).

Upon receiving the resize PV capacity command, the undercluster CSI driver 162 may transmit a new PV size command to the logical volume manager 206 indicating the new size (e.g., capacity) for the persistent volume 204. The new PV size command causes the logical volume manager 206 to provision the increased capacity 402 for the persistent volume 204. In embodiments, the logical volume manager 206 may provision the increased capacity 402 by creating a new partition that defines the storage provisioned to the persistent volume 204.

Figure 5:
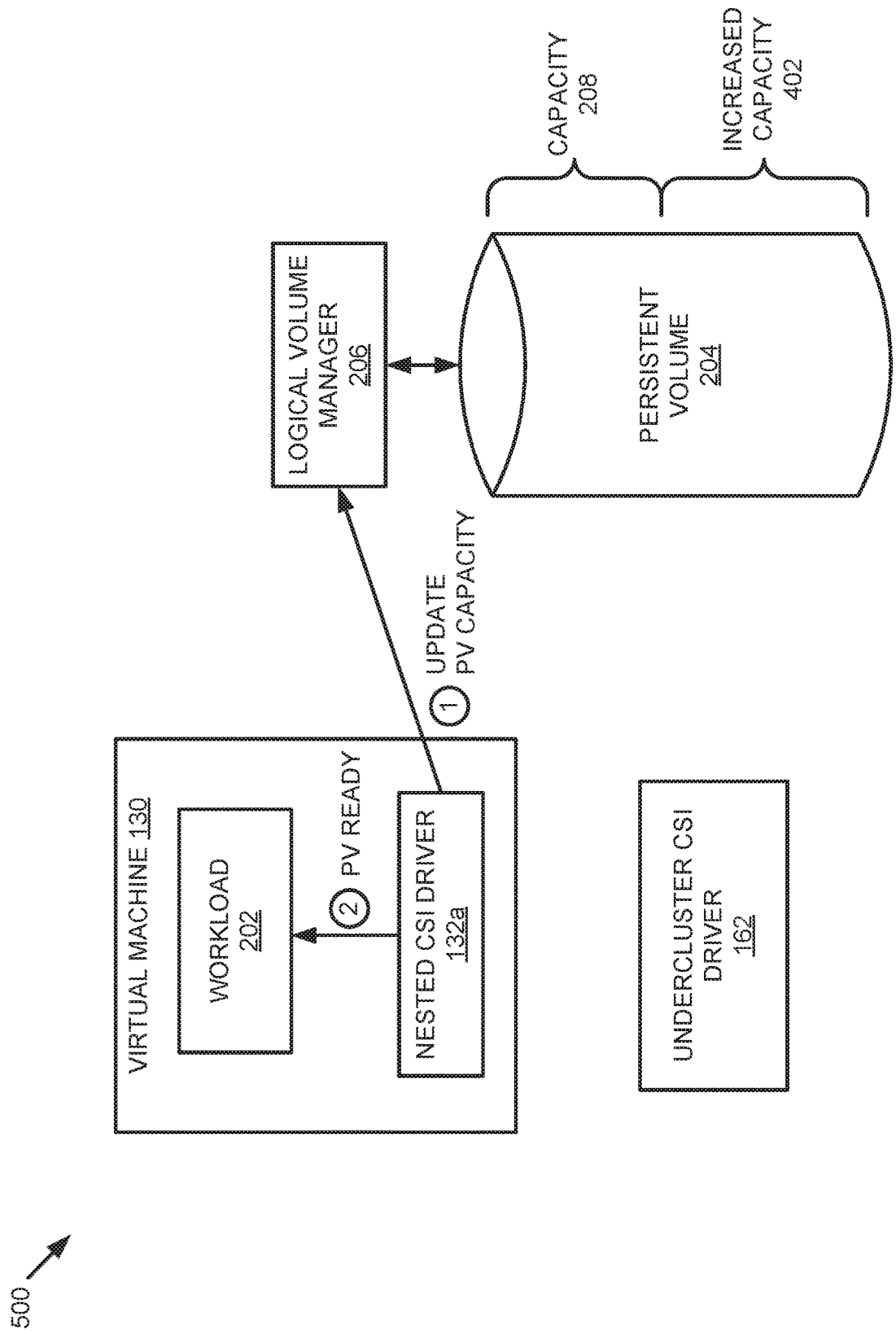
FIG. 5 is an illustration of an example of a nested CSI driver of a host system making an increased capacity of a persistent volume available to a workload, in accordance with embodiments of the disclosure.

FIG. 5 is an illustration of an example of a nested CSI driver of a host system 500 making an increased capacity of a persistent volume available to a workload, in accordance with embodiments of the disclosure. Upon the logical volume manager 206 provisioning the increased capacity 402 for the persistent volume 204, the nested CSI driver 132a may update the capacity of the persistent volume 204 to the new capacity (e.g., capacity 208 and increased capacity 402). In embodiments, the nested CSI driver 132a may update the partitions of the persistent volume 204 to include the new partition created by the logical volume manager 206.

Upon updating the capacity of the persistent volume 204, the nested CSI driver 132a may transmit an indication to the workload 202 that the persistent volume 204 is ready (e.g., PV ready) for use by the workload 202 and includes the capacity requested by the create PV command previously described at FIG. 3. Upon receipt of the indication, the workload 202 may begin accessing the storage space provisioned to persistent volume 204.

Figure 6:
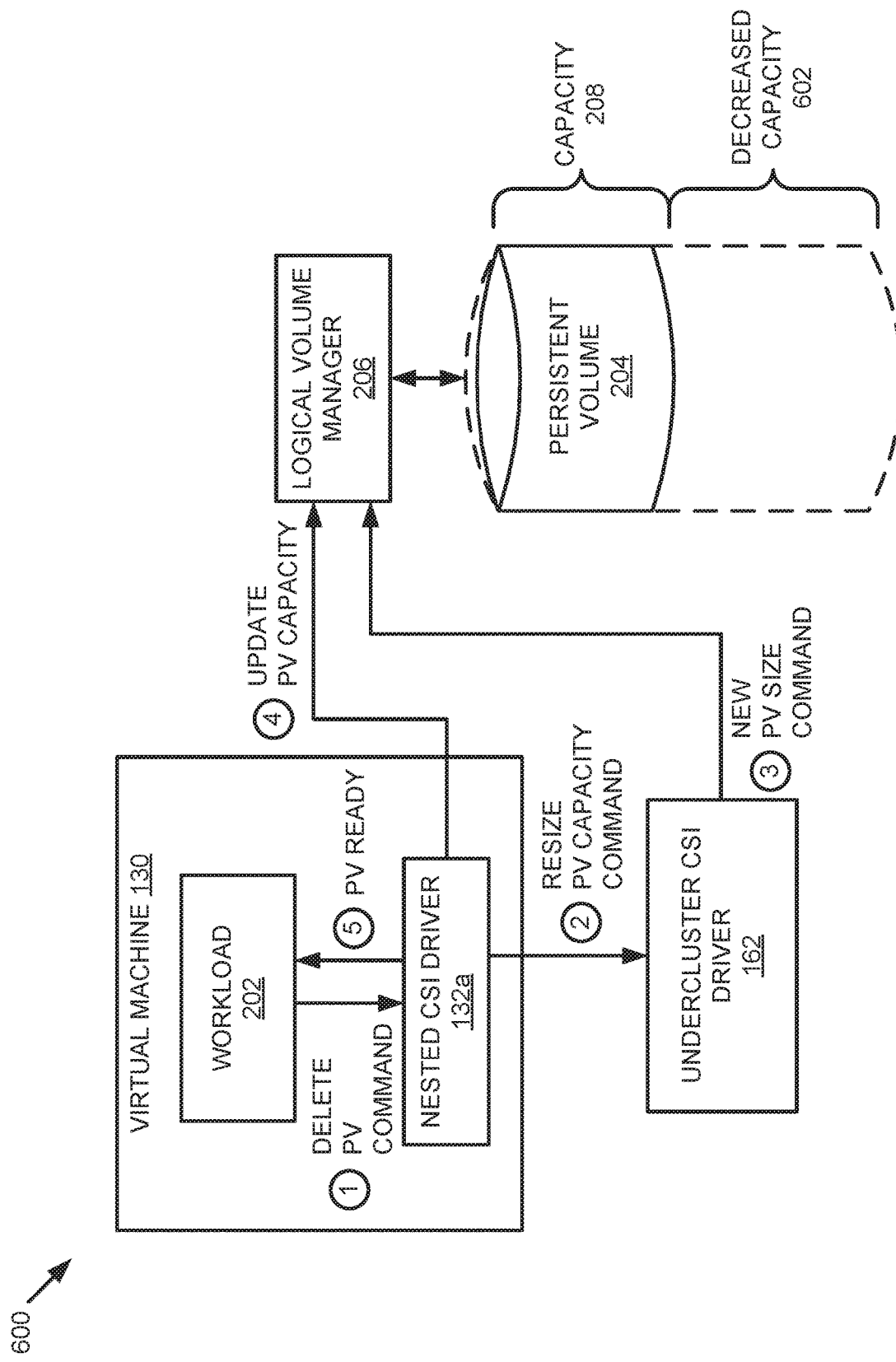
FIG. 6 is an illustration of an example of a nested CSI driver of a host system resizing a persistent volume in response to receiving a delete persistent volume command from a workload, in accordance with embodiments of the disclosure.

FIG. 6 is an illustration of an example of a nested CSI driver of a host system 600 resizing a persistent volume in response to receiving a delete persistent volume command from a workload, in accordance with embodiments of the disclosure. FIG. 6 may include similar operations to the operations described at FIGS. 2-5. However, while FIGS. 2-5 illustrate operations for resizing persistent volume 204 in response to receiving a create PV command from workload 202, FIG. 6 illustrates operations for resizing persistent volume 204 in response to receiving a delete PV command from workload 202.

In FIG. 6, the nested CSI driver 132a receives a delete PV command from workload 202. In embodiments, the delete PV command may indicate a capacity of the persistent volume 204 to be deleted. For example, the delete PV command may indicate that the persistent volume 204 to be deleted is 6 GB.

Upon receiving the delete PV command, the nested CSI driver 132a may convert the delete PV command into a resize PV capacity command. In embodiments, the nested CSI driver 132a may convert the delete PV command using the one or more specifications associated with the persistent volume 204, as previously described. In some embodiments, the resize PV capacity command may include a capacity that persistent volume 204 is to be resized by based on the delete PV command. For example, if the delete PV command indicates that the persistent volume 204 to be deleted is 6 GB, then the resize PV capacity command may indicate that the capacity of persistent volume 204 is to be decreased by 6 GB.

Upon receiving the resize PV capacity command, the undercluster CSI driver 162 may transmit a new PV size command to the logical volume manager 206, as previously described at FIG. 4. The logical volume manager 206 may then decrease the capacity (e.g., decreased capacity 602) of the persistent volume 204 in view of the new PV size command. For example, the logical volume manage 206 may decrease the amount of storage provisioned to the persistent volume 204. In embodiments, the logical volume manager 206 may decrease the capacity of the persistent volume 204 by removing a partition that defines the storage capacity of the persistent volume 204, as previously described.

Upon the logical volume manager 206 decreasing the capacity of persistent volume 204, the nested CSI driver 132a may update the PV capacity and transmit an indication to workload 202 that the persistent volume 204 is ready for use by workload 202, as previously described at FIG. 5.

Figure 7:
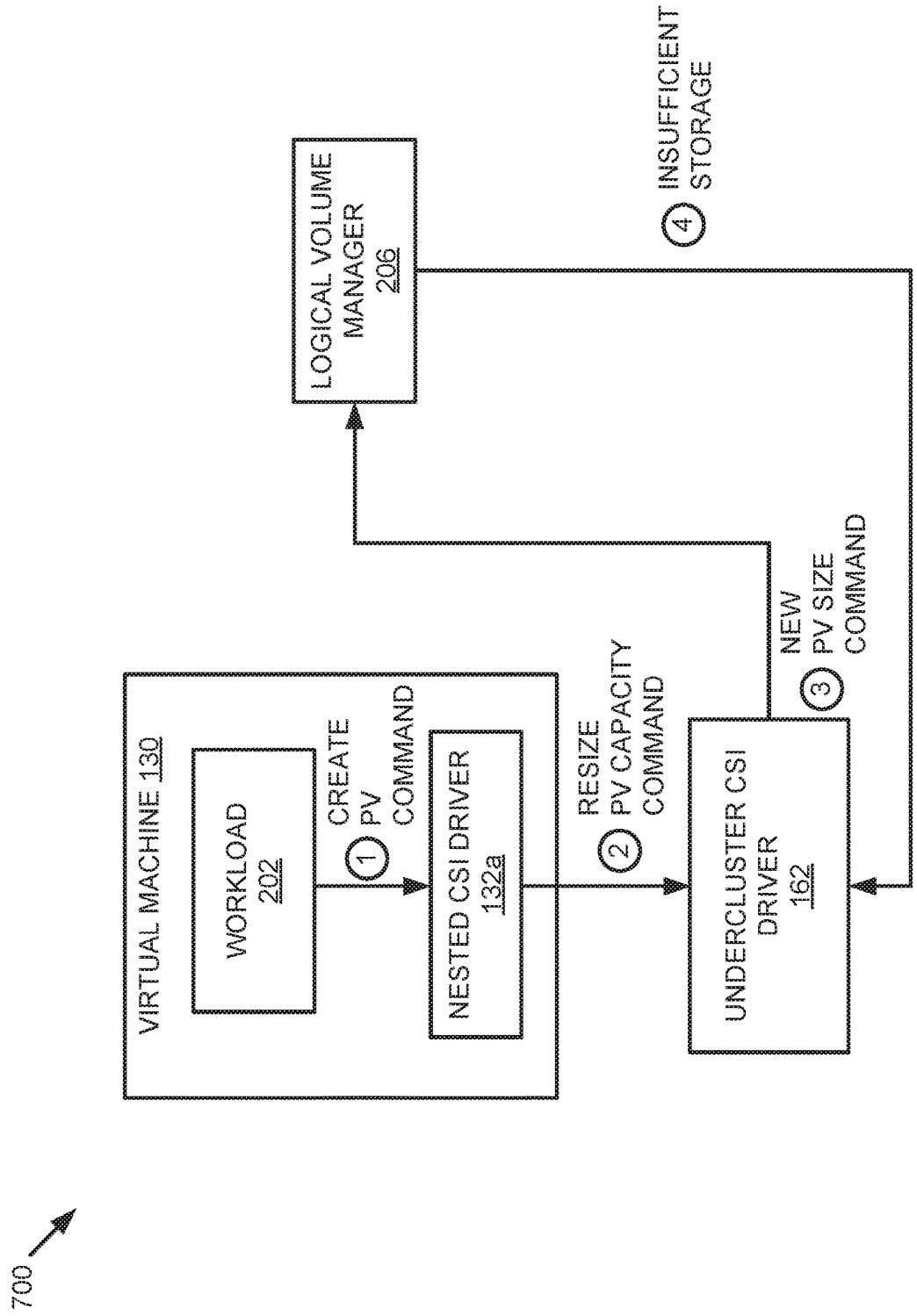
FIG. 7 is an illustration of an example of a host system having insufficient storage to resize a persistent volume allocated to a virtual machine, in accordance with embodiments of the disclosure.

FIG. 7 is an illustration of an example of a host system 700 having insufficient storage to resize a persistent volume allocated to a virtual machine, in accordance with embodiments of the disclosure. As previously described, a persistent volume (e.g., persistent volume 204) may be a provisioned storage space of underlying physical storage (e.g., storage device 180). In an example scenario, when utilization of the physical storage is high (e.g., the amount of data stored at storage device 180 is at or near capacity), the logical volume manager 206 may be unable to increase the capacity of a persistent volume because there is insufficient space available on the underlying storage device to increase the capacity. Accordingly, when the nested CSI driver 132a and undercluster CSI driver 162 attempt to resize a persistent volume allocated to virtual machine 130 in response to receiving a create PV command from workload 202, as previously described at FIGS. 2-4, the logical volume manager 206 may transmit an indication to the undercluster CSI driver 162 that there is insufficient storage available for the logical volume manager 206 to increase the capacity of the persistent volume.

In some embodiments, upon receiving the indication of insufficient storage, the undercluster CSI driver 162 may transmit an indication to the nested CSI driver 132a indicating that the resize of the persistent volume was unsuccessful. The nested CSI driver 132a may then transmit an indication to the workload 202 indicating that the create PV command was unsuccessful. In embodiments, one or more persistent volumes on other host systems (e.g., host system 110b) of a microservice architecture may be allocated to virtual machine 130. In such embodiments, the undercluster CSI driver 162 may attempt to resize one of these persistent volumes on another host system, as will be described in further detail below.

Figure 8:
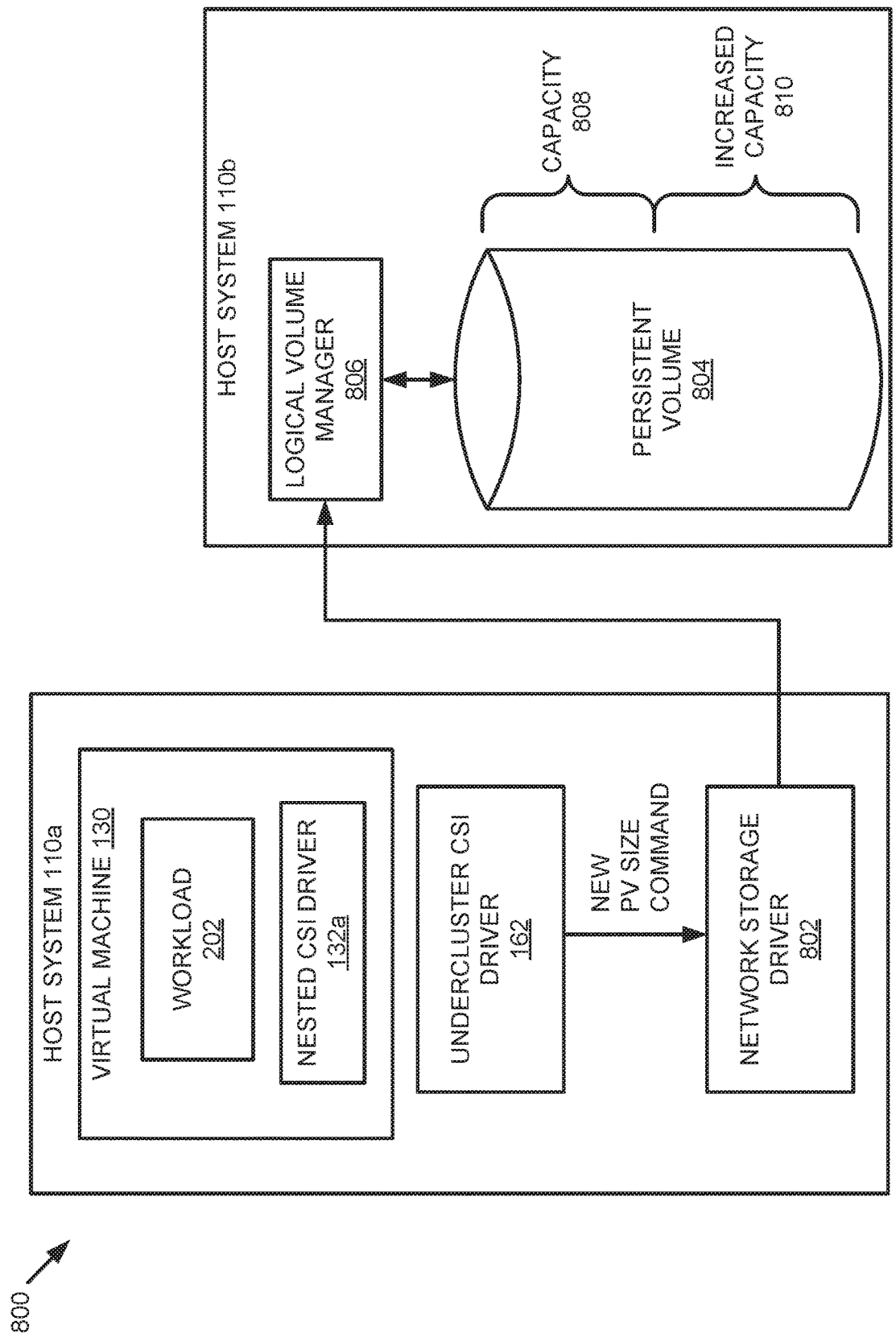
FIG. 8 is an illustration of an example of a network storage driver of a first host system of a microservice architecture transmitting a command to resize a persistent volume to a second host system, in accordance with embodiments of the disclosure.

FIG. 8 is an illustration of an example of a network storage driver of a first host system of a microservice architecture 800 transmitting a command to resize a persistent volume to a second host system, in accordance with embodiments of the disclosure. The microservice architecture 800 may include host system 110a and host system 110b that are operatively coupled to one another via a network (not shown), as previously described at FIG. 1. The host system 110b may include a logical volume manager 806 that manages the provisioning of storage space to persistent volumes, such as persistent volume 804. The persistent volume 804 may have an initial capacity 808 that corresponds to a capacity of the persistent volume 804 prior to modification. The host system 110a includes a network storage driver 802 that facilitates the storage of data on persistent volumes of other host systems (e.g., host system 110b) of the microservice architecture 800.

In embodiments, the undercluster CSI driver 162 may transmit a new PV size command to the network storage driver 802 to cause the modification of the capacity 808 of persistent volume 804 at host system 110b, as previously described at FIG. 4. In FIG. 8, the new PV size command may indicate that the capacity 808 of persistent volume 804 is to be increased by a particular amount (e.g., increased capacity 810). In some embodiments, the undercluster CSI driver 162 may transmit the new PV size command to the network storage driver 802 in response to receiving an indication from a logical volume manager (not shown) of host system 110a indicating there is insufficient storage to perform a resize operation, as previously described in FIG. 7. The network storage driver 802 may transmit a command to logical volume manager 806 of host system 110b via a network of the microservice architecture 800. The command may cause the logical volume manager 806 to increase the capacity of persistent volume 804, as previously described at FIG. 4. Upon the logical volume manager 806 increasing the capacity of persistent volume 804, the nested CSI driver 132a may update the capacity of persistent volume 804 and transmit an indication to workload 202 that the increased capacity 810 of persistent volume 804 is ready for use by workload 202, as previously described at FIG. 5.

Figure 9:
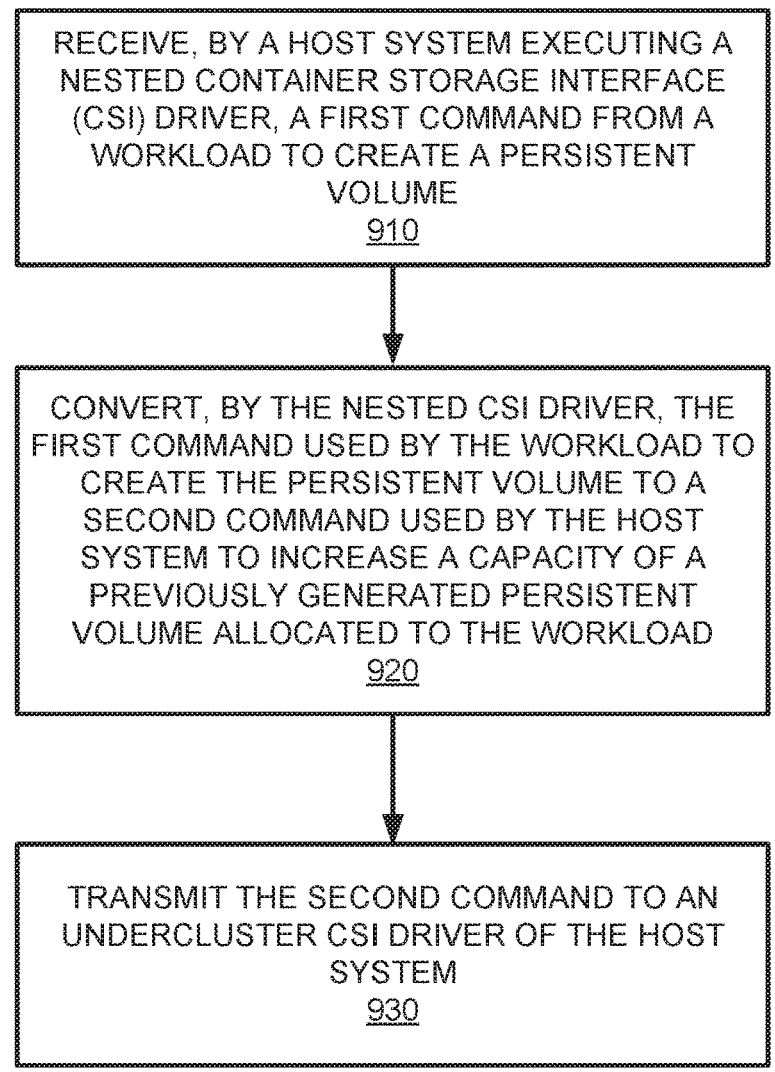
FIG. 9 is a flow diagram of a method of converting a command to create a persistent volume to a resize command, in accordance with some embodiments.

FIG. 9 is a flow diagram of a method 900 of converting a command to create a persistent volume to a resize command, in accordance with some embodiments. Method 900 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 900 may be performed by nested CSI driver 132a and/or nested CSI driver 132b of FIG. 1.

With reference to FIG. 9, method 900 illustrates example functions used by various embodiments. Although specific function blocks ("blocks") are disclosed in method 900, such blocks are examples. That is, embodiments are well suited to performing various other blocks or variations of the blocks recited in method 900. It is appreciated that the blocks in method 900 may be performed in an order different than presented, and that not all of the blocks in method 900 may be performed.

Method 900 begins at block 910, where the processing logic receives a first command from a workload to create a persistent volume.

At block 920, the processing logic converts the first command used by the workload to create the persistent volume to a second command used by the host system to increase a capacity of a previously generated persistent volume allocated to the workload.

At block 930, the processing logic transmits the second command to an undercluster CSI driver of the host system. The second command may cause the undercluster CSI driver to increase the capacity of the previously generated persistent volume. In embodiments, the undercluster CSI driver may increase the capacity of the previously generated persistent volume by transmitting a command to a volume management component, such as a logical volume manager or network storage driver, as previously described.

Figure 10:
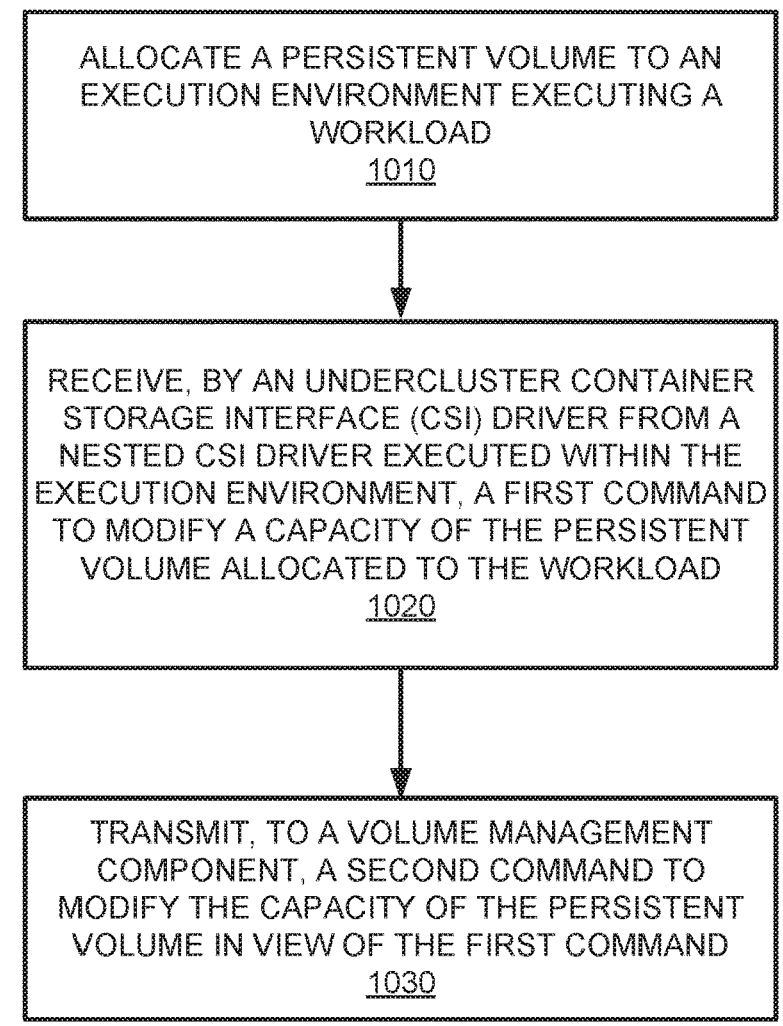
FIG. 10 is a flow diagram of a method of modifying a capacity of a persistent volume allocated to an execution environment, in accordance with some embodiments.

FIG. 10 is a flow diagram of a method 1000 of modifying a capacity of a persistent volume allocated to an execution environment, in accordance with some embodiments. Method 1000 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 1000 may be performed by undercluster CSI driver 162 of FIG. 1.

With reference to FIG. 10, method 1000 illustrates example functions used by various embodiments. Although specific function blocks ("blocks") are disclosed in method 1000, such blocks are examples. That is, embodiments are well suited to performing various other blocks or variations of the blocks recited in method 1000. It is appreciated that the blocks in method 1000 may be performed in an order different than presented, and that not all of the blocks in method 1000 may be performed.

Method 1000 begins at block 1010, where the processing logic allocates a persistent volume to an execution environment executing a workload. In embodiments, the execution environment may be a virtual machine. In some embodiments, the execution environment may be a container.

At block 1020, the processing logic receives, from a nested CSI driver, a first command to modify a capacity of the persistent volume allocated to the workload.

At block 1030, the processing logic transmits, to a volume management component, a second command to modify the capacity of the persistent volume in view of the first command. The command may cause the volume management component to modify the capacity of the persistent volume, as previously described.

FIG. 11 is a flow diagram of a method 1100 of generating an execution environment for execution of a workload, in accordance with some embodiments. Method 1100 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 1100 may be performed by processing device 160 of FIG. 1.

With reference to FIG. 11, method 1100 illustrates example functions used by various embodiments. Although specific function blocks ("blocks") are disclosed in method 1100, such blocks are examples. That is, embodiments are well suited to performing various other blocks or variations of the blocks recited in method 1100. It is appreciated that the blocks in method 1100 may be performed in an order different than presented, and that not all of the blocks in method 1100 may be performed.

Method 1100 begins at block 1110, where the processing logic generates an execution environment for execution of the workload. The execution environment includes a nested CSI driver that converts a first command received from the workload to a second command used by a host system.

At block 1120, the processing logic allocates a persistent volume on the host system to the execution environment. The capacity of the persistent volume may be modified in view of the second command used by the host system, as previously described.

FIG. 1200 is a flow diagram of a method 1200 of transmitting a command to modify a capacity of a persistent volume on another host system, in accordance with some embodiments. Method 1200 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 1200 may be performed by undercluster CSI driver 162 of FIG. 1.

Figure 12:
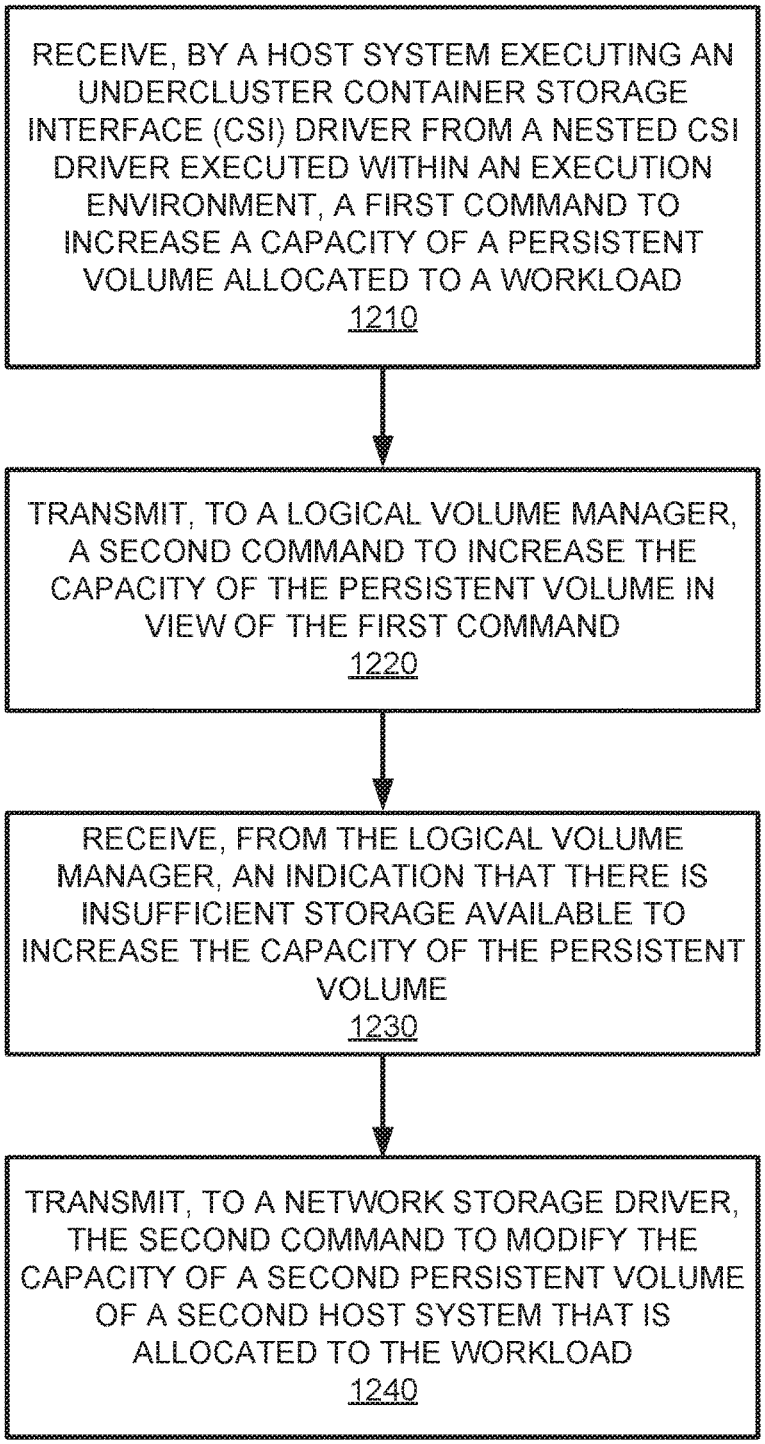
FIG. 12 is a flow diagram of a method of transmitting a command to modify a capacity of a persistent volume on another host system, in accordance with some embodiments.

With reference to FIG. 12, method 1200 illustrates example functions used by various embodiments. Although specific function blocks ("blocks") are disclosed in method 1200, such blocks are examples. That is, embodiments are well suited to performing various other blocks or variations of the blocks recited in method 1200. It is appreciated that the blocks in method 1200 may be performed in an order different than presented, and that not all of the blocks in method 1200 may be performed.

Method 1200 begins at block 1210, where the processing logic receives, from a nested CSI driver executed within an execution environment, a first command to increase a capacity of a persistent volume allocated to a workload.

At block 1220, the processing logic transmits, a logical volume manager, a second command to increase the capacity of the persistent volume in view of the first command.

At block 1230, the processing logic receives, from the logical volume manager, an indication that there is insufficient storage available to increase the capacity of the persistent volume.

At block 1240, the processing logic transmits, to a network storage driver, the second command to modify the capacity of a second persistent volume of a second host system that is allocated to the workload.

Figure 13:
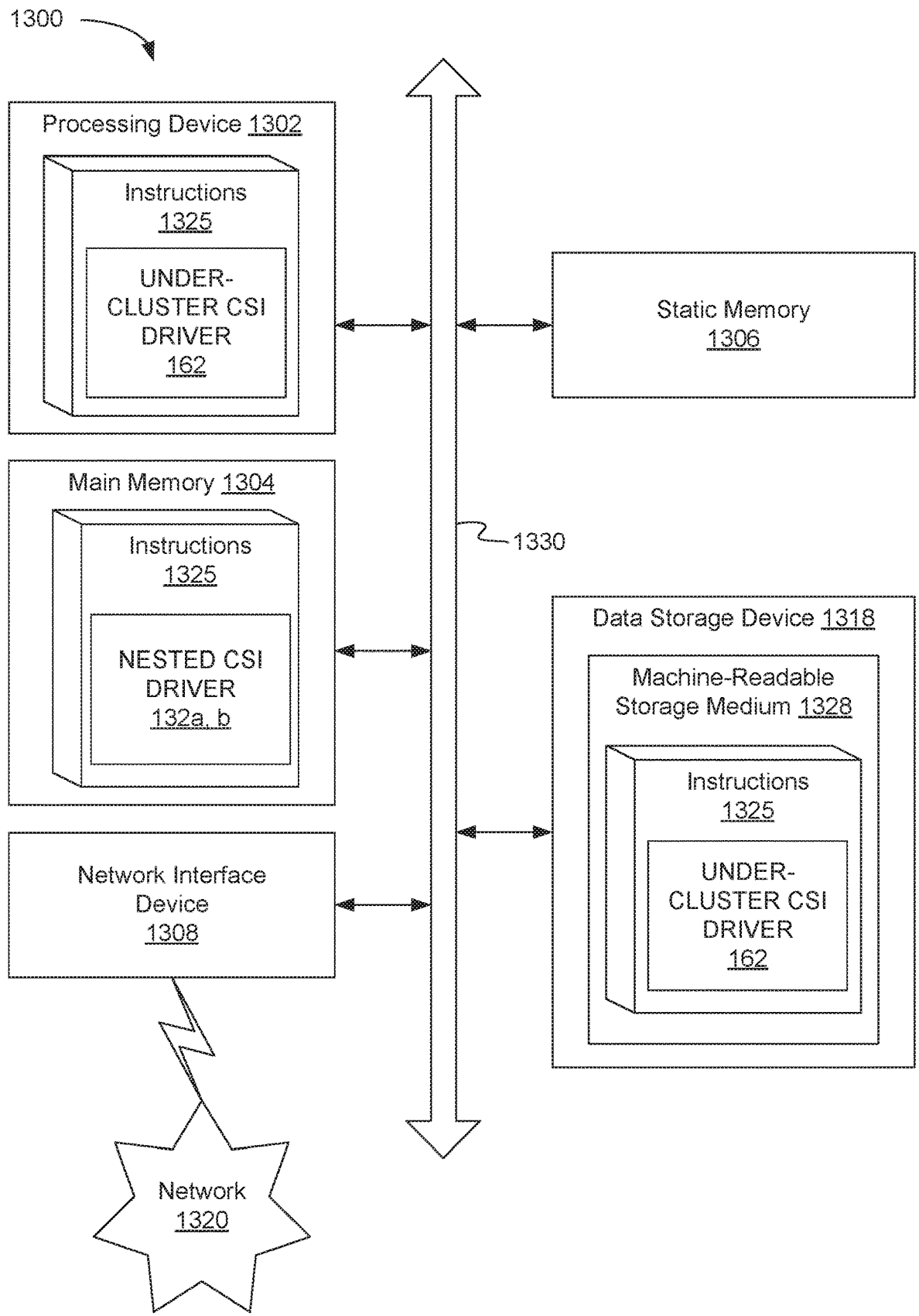
FIG. 13 is a block diagram of an example apparatus that may perform one or more of the operations described herein, in accordance with some embodiments of the present disclosure.

FIG. 13 is a block diagram of an example computing device 1300 that may perform one or more of the operations described herein, in accordance with some embodiments. Computing device 1300 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1300 may include a processing device (e.g., a general purpose processor, a PLD, etc.) 1302, a main memory 1304 (e.g., synchronous dynamic random access memory (DRAM), read-only memory (ROM)), a static memory 1306 (e.g., flash memory and a data storage device 1318), which may communicate with each other via a bus 1330.

Processing device 1302 may be provided by one or more general-purpose processing devices such as a microprocessor, central processing unit, or the like. In an illustrative example, processing device 1302 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1302 may also comprise one or more special-purpose processing devices such as an application specific integrated circuit (ASIC), a field programmable gate array (FPGA), a digital signal processor (DSP), network processor, or the like. The processing device 1302 may be configured to execute the operations described herein, in accordance with one or more aspects of the present disclosure, for performing the operations and steps discussed herein. Computing device 1300 may further include a network interface device 1308 which may communicate with a network 1320.

Data storage device 1318 may include a computer-readable storage medium 1328 on which may be stored one or more sets of instructions 1325 that may include instructions for a nested CSI driver or undercluster CSI driver, e.g., nested CSI driver 132a, nested CSI driver 132b, and/or undercluster CSI driver 162 for carrying out the operations described herein, in accordance with one or more aspects of the present disclosure. Instructions 1325 may also reside, completely or at least partially, within main memory 1304 and/or within processing device 1302 during execution thereof by computing device 1300, main memory 1304 and processing device 1302 also constituting computer-readable media. The instructions 1325 may further be transmitted or received over a network 1320 via network interface device 1308.

While computer-readable storage medium 1328 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising receiving, by a processing device of a host system executing a nested container storage interface (CSI) driver, a first command from a workload to create a persistent volume; converting, by the nested CSI driver, the first command used by the workload to create the persistent volume to a second command used by the host system to increase a capacity of a previously generated persistent volume allocated to the workload; and transmitting the second command to an undercluster CSI driver of the host system, wherein the second command causes the undercluster CSI driver to increase the capacity of the previously generated persistent volume.

Example 2 is the method of Example 1, further comprising receiving a third command from the workload to delete the persistent volume; converting the third command used by the workload to delete the persistent volume to a fourth command used by the host system to decrease the capacity of the previously generated persistent volume allocated to the workload; and transmitting the fourth command to the undercluster CSI driver of the host system, wherein the fourth command causes the undercluster CSI driver to decrease the capacity of the previously generated persistent volume.

Example 3 is the method of Example 1, further comprising updating, by the nested CSI driver, the capacity of the previously generated persistent volume that is available for use by the workload.

Example 4 is the method of Example 3, further comprising providing an indication to the workload that the updated capacity of the previously generated persistent volume is available for use by the workload.

Example 5 is the method of Example 1, wherein the workload and the nested CSI driver are executed within a virtual machine.

Example 6 is the method of Example 1, wherein the workload and the nested CSI driver are executed within a container.

Example 7 is the method of Example 1, wherein the second command comprises an amount to increase the capacity of the previously generated persistent volume.

Example 8 is a system comprising a memory; and a processing device, operatively coupled to the memory, to allocate a persistent volume to an execution environment executing a workload; receive, by an undercluster container storage interface (CSI) driver from a nested CSI driver executed within the execution environment, a first command to modify a capacity of the persistent volume allocated to the workload; and transmit, to a volume management component, a second command to modify the capacity of the persistent volume in view of the first command, wherein the second command causes the volume management component to modify the capacity of the persistent volume.

Example 9 is the system of Example 8, wherein the nested CSI driver updates the capacity of the persistent volume allocated to the execution environment in response to the capacity of the persistent volume being modified.

Example 10 is the system of Example 8, wherein the volume management component comprises a logical volume manager.

Example 11 is the system of Example 8, wherein the volume management component comprises a network storage driver.

Example 12 is the system of Example 8, wherein the first command to modify the capacity is received from the nested CSI driver in response to the workload providing a third command to create a second persistent volume.

Example 13 is the system of Example 12, wherein the nested CSI driver converts the third command into the first command to modify the capacity of the persistent volume, and wherein the second command comprises a command to increase the capacity of the persistent volume.

Example 14 is the system of Example 8, wherein the first command to modify the capacity is received from the nested CSI driver in response to the workload providing a third command to delete the persistent volume.

Example 15 is the system of Example 14, wherein the nested CSI driver converts the third command into the first command to modify the capacity of the persistent volume, and wherein the second command comprises a command to increase the capacity of the persistent volume.

Example 16 is a non-transitory computer-readable storage medium including instructions that, when executed by a processing device of a host system, cause the processing device to generate, by the processing device of the host system, an execution environment for execution of a workload, wherein the execution environment comprises a nested container storage interface (CSI) driver that converts a first command received from the workload to a second command used by the host system; and allocating a persistent volume on the host system to the execution environment, wherein a capacity of the persistent volume is modified in view of the second command used by the host system.

Example 17 is the non-transitory computer-readable storage medium of Example 16, wherein the first command comprises a command to create a persistent volume for the workload and the second command comprises a command to increase the capacity of the persistent volume.

Example 18 is the non-transitory computer-readable storage medium of Example 16, wherein the first command comprises a command to delete a persistent volume for the workload and the second command comprises a command to decrease the capacity of the persistent volume.

Example 19 is the non-transitory computer-readable storage medium of Example 16, wherein generating the execution environment for the execution of the workload comprises providing, to the nested CSI driver, one or more specifications associated with modifying the capacity of the persistent volume, wherein the one or more specifications are used by the nested CSI driver to convert the first command to the second command.

Example 20 is the non-transitory computer-readable storage medium of Example 16, wherein allocating the persistent volume on the host system to the execution environment comprises annotating the persistent volume with a reference to the execution environment, wherein the nested CSI driver is to expose the persistent volume to the execution environment in view of the reference.

Example 21 is the non-transitory computer-readable storage medium of Example 16, wherein the processing device is further to allocate a second persistent volume on a second host system to the execution environment, wherein the nested CSI driver converts the first command received from the workload to a third command used by the second host system.

Example 22 is the non-transitory computer-readable storage medium of Example 16, wherein the first command comprises a first storage application programming interface (API) used by the workload and the second command comprises a second storage API used by the host system.

Example 23 is a method comprising receiving, by a processing device of a host system executing an undercluster container storage interface (CSI) driver from a nested CSI driver executed within an execution environment, a first command to increase a capacity of a persistent volume allocated to a workload; transmitting, to a logical volume manager, a second command to increase the capacity of the persistent volume in view of the first command; receiving, from the logical volume manager, an indication that there is insufficient storage available to increase the capacity of the persistent volume; and transmitting, to a network storage driver, the second command to increase the capacity of a second persistent volume of a second host system that is allocated to the workload.

Example 24 is the method of Example 23, wherein the nested CSI driver converts a third command received from the workload to create a new persistent volume to generate the first command that is used by the host system.

Example 25 is the method of Example 23, wherein the execution environment comprises a virtual machine.

Example 26 is the method of Example 23, wherein the execution environment comprises a container.

Example 27 is the method of Example 23, wherein the second command causes a second logical volume manager of the second host system to increase the capacity of the second persistent volume.

Example 28 is the method of Example 27, further comprising updating, by the nested CSI driver, the capacity of the second persistent volume in response to the capacity of the second persistent volume being increased.

Example 29 is the method of Example 28, further comprising providing, to the nested CSI driver, an indication that the capacity of the second persistent volume has increased, wherein the nested CSI driver is to notify the workload that the increased capacity of the second persistent volume is available for use by the workload.

Example 30 is an apparatus comprising means for receiving a first command from a workload executed by a host system to create a persistent volume; means for converting the first command used by the workload to create the persistent volume to a second command used by the host system to increase a capacity of a previously generated persistent volume allocated to the workload; and means for transmitting the second command to an undercluster CSI driver of the host system, wherein the second command causes the undercluster CSI driver to increase the capacity of the previously generated persistent volume.

Example 31 is the apparatus of Example 30, further comprising means for receiving a third command from the workload to delete the persistent volume; means for converting the third command used by the workload to delete the persistent volume to a fourth command used by the host system to decrease the capacity of the previously generated persistent volume allocated to the workload; and means for transmitting the fourth command to the undercluster CSI driver of the host system, wherein the fourth command causes the undercluster CSI driver to decrease the capacity of the previously generated persistent volume.

Example 32 is the apparatus of Example 30, further comprising means for receiving, from a volume management component, an indication that the capacity of the previously generated persistent volume has been increased; and means for updating the capacity of the previously generated persistent volume that is available for use by the workload.

Example 33 is the apparatus of Example 30, further comprising means for providing a second indication to the workload that the updated capacity of the previously generated persistent volume is available for use by the workload.

Example 34 is the apparatus of Example 30, wherein the workload and a nested CSI driver are executed within a virtual machine.

Example 35 is the apparatus of Example 30, wherein the workload and a nested CSI driver are executed within a container.

Example 36 is the apparatus of Example 30, wherein the second command comprises an amount to increase the capacity of the previously generated persistent volume.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   instantiating, by a host system, a virtual machine comprising an overcluster that resides in the virtual machine, wherein the overcluster comprises a nested container storage interface (CSI) driver;
   providing communication endpoints of an undercluster CSI driver of an undercluster residing on the host system to the nested CSI driver to enable transmission of commands from the nested CSI driver to the undercluster CSI driver;
   receiving, at the nested CSI driver, a create-volume command from a workload executing in the virtual machine, wherein the create-volume command is to create a new persistent volume to be provisioned for storage of data generated by the workload;
   converting, by the nested CSI driver, the create-volume command to a resize command that identifies a previously generated persistent volume allocated to the workload;
   transmitting the resize command to the undercluster CSI driver, wherein the resize command causes the undercluster CSI driver to increase a capacity of the previously generated persistent volume, wherein the undercluster is a first cluster management operator managing a cluster of physical computing resources that support the virtual machine, and wherein the overcluster is second cluster management operator executing within the virtual machine; and
   transmitting, from the undercluster CSI driver to a volume management component in view of the resize command, an additional command to increase the capacity of the previously generated persistent volume, wherein the volume management component is a logical volume manager or network storage driver.

2. The method of claim 1, further comprising:
   receiving a third command from the workload to delete the persistent volume;
   converting the third command used by the workload to delete the persistent volume to a fourth command used by the host system to decrease the capacity of the previously generated persistent volume allocated to the workload; and
   transmitting the fourth command to the undercluster CSI driver of the host system, wherein the fourth command causes the undercluster CSI driver to decrease the capacity of the previously generated persistent volume.

3. The method of claim 1, further comprising:
   updating, by the nested CSI driver, the capacity of the previously generated persistent volume that is available for use by the workload.

4. The method of claim 3, further comprising:
   providing an indication to the workload that the updated capacity of the previously generated persistent volume is available for use by the workload.

5. The method of claim 1, wherein the resize command comprises an amount to increase the capacity of the previously generated persistent volume.

6. A system comprising:
   a memory; and
   a processing device, operatively coupled to the memory, to:
   allocate, by a host system, a persistent volume to a virtual machine executing a workload and executing an overcluster comprising a nested container storage interface (CSI) driver;
   provide communication endpoints of an undercluster CSI driver of an undercluster residing on the host system to the nested CSI driver to enable transmission of commands from the nested CSI driver to the undercluster CSI driver;
   receive, by the nested CSI driver from the workload, a create-volume command, wherein the create-volume command is a request to provision a new persistent volume for storage of data generated by the workload;
   convert, by the nested CSI driver, the create-volume command into a resize command, wherein the resize command is a request to modify a capacity of a previously generated persistent volume;
   receive, by the undercluster CSI driver of the undercluster from the nested CSI driver of the overcluster executed within the virtual machine, the resize command to modify the capacity of the previously generated persistent volume; and
   transmit, to a volume management component, a command to modify the capacity of the persistent volume in view of the resize command, wherein the command causes the volume management component to modify the capacity of the persistent volume, wherein the undercluster is a first cluster management operator managing a cluster of physical computing resources that support the virtual machine, and wherein the overcluster is second cluster management operator executing within the virtual machine.

7. The system of claim 6, wherein the nested CSI driver updates the capacity of the previously generated persistent volume allocated to the virtual machine in response to the capacity of the previously generated persistent volume being modified.

8. The system of claim 6, wherein the volume management component comprises a logical volume manager.

9. The system of claim 6, wherein the volume management component comprises a network storage driver.

10. The system of claim 6, wherein the undercluster CSI driver is to receive a first command to modify the capacity of the persistent volume from the nested CSI driver in response to the workload providing a second command to delete the persistent volume.

11. A non-transitory computer-readable storage medium including instructions that, when executed by a processing device of a host system, cause the processing device to:
    generate, by the processing device of the host system, a virtual machine for execution of a workload, wherein the virtual machine comprises a nested container storage interface (CSI) driver included in an overcluster;

provide communication endpoints of an undercluster CSI driver of an undercluster residing on the host system to the nested CSI driver to enable transmission of commands from the nested CSI driver to the undercluster CSI driver;

convert, by the nested CSI driver, a first command received from the workload to a second command used by the host system, wherein the first command is a request to create or delete a persistent volume and the second command is a command to resize an existing persistent volume send the second command to the undercluster CSI driver, wherein the undercluster is a first cluster management operator managing a cluster of physical computing resources that support the virtual machine, and wherein the overcluster is a second cluster management operator executing within the virtual machine; and allocate a persistent volume on the host system to the virtual machine, wherein a capacity of the persistent volume is modified by a volume management component in view of the second command used by the host system.

12. The non-transitory computer-readable storage medium of claim 11, wherein the first command comprises a command to create a persistent volume for the workload and the second command comprises a command to increase the capacity of the persistent volume.

13. The non-transitory computer-readable storage medium of claim 11, wherein the first command comprises a command to delete a persistent volume for the workload and the second command comprises a command to decrease the capacity of the persistent volume.

14. The non-transitory computer-readable storage medium of claim 11, wherein to generate the virtual machine for the execution of the workload, the processing device is to:

provide, to the nested CSI driver, one or more specifications associated with modifying the capacity of the persistent volume, wherein the one or more specifications are used by the nested CSI driver to convert the first command to the second command.

15. The non-transitory computer-readable storage medium of claim 11, wherein to allocate the persistent volume on the host system to the virtual machine, the processing device to:

annotate the persistent volume with a reference to the execution environment, wherein the nested CSI driver is to expose the persistent volume to the execution environment in view of the reference.

* * * * *